(12) United States Patent
Blanchard et al.

(10) Patent No.: US 6,506,705 B2
(45) Date of Patent: Jan. 14, 2003

(54) COMPOSITION BASED ON CERIUM OXIDE OR ON CERIUM AND ZIRCONIUM OXIDES, IN THE EXTRUDED FORM, PROCESS FOR THE PREPARATION THEREOF AND USE THEREOF AS CATALYST

(75) Inventors: Gilbert Blanchard, Lagny le Sec (FR); Eric Quemere, Cormeilles en Parisis (FR)

(73) Assignee: Rhodia Chimie, Boulogne Billancourt Cedex (FR)

( * ) Notice: Subject to any disclaimer, the term of this patent is extended or adjusted under 35 U.S.C. 154(b) by 0 days.

(21) Appl. No.: 10/007,209

(22) Filed: Oct. 24, 2001

(65) Prior Publication Data

US 2002/0115563 A1 Aug. 22, 2002

Related U.S. Application Data

(63) Continuation of application No. 09/319,371, filed as application No. PCT/FR97/02190 on Dec. 3, 1997.

(30) Foreign Application Priority Data

Dec. 6, 1996 (FR) .............................. 96 15000

(51) Int. Cl.[7] ................................ B01J 21/00
(52) U.S. Cl. ..................... 502/300; 502/302; 502/304; 502/305; 502/324; 502/325; 502/340; 502/349; 502/353; 502/355
(58) Field of Search ................................ 502/300, 302, 502/304, 305, 324, 325, 340, 349, 353, 355

(56) References Cited

U.S. PATENT DOCUMENTS

| | | | |
|---|---|---|---|
| 3,883,445 A | 5/1975 | Roth | 252/462 |
| 3,894,968 A | 7/1975 | Berger | 252/455 R |
| 4,039,474 A | 8/1977 | Feistel | 252/451 |
| 4,857,296 A | 8/1989 | Brunelle | 423/574 R |
| 5,073,532 A | 12/1991 | Domesle | 502/304 |
| 5,075,276 A | 12/1991 | Ozawa | 502/304 |
| 5,168,084 A | 12/1992 | Pellet | 502/9 |
| 5,413,975 A | 5/1995 | Mueller | 502/60 |
| 5,532,198 A | 7/1996 | Chopin | 502/304 |
| 5,607,892 A | 3/1997 | Chopin | 502/304 |
| 5,626,826 A | 5/1997 | Chopin | 423/213.2 |
| 5,693,299 A | 12/1997 | Chopin | 423/213.2 |
| 5,712,218 A | 1/1998 | Chopin | 502/304 |
| 5,883,037 A | 3/1999 | Chopin | 502/308 |
| 5,908,800 A | 6/1999 | Bonneau | 501/103 |
| 5,939,351 A | 8/1999 | Rubini | 502/313 |
| 6,037,305 A | 3/2000 | Cuif | 502/304 |
| 6,040,265 A | 3/2000 | Nunan | 502/242 |
| 6,051,529 A | 4/2000 | Brezny | 502/302 |
| 6,133,194 A | 10/2000 | Cuif | 502/506 |
| 6,228,799 B1 * | 5/2001 | Aubert et al. | 502/304 |
| 6,248,688 B1 * | 6/2001 | Wu et al. | 502/302 |
| 6,358,880 B1 * | 3/2002 | Hedouin et al. | 502/302 |
| 2001/0036901 A1 * | 11/2001 | Koda et al. | 502/304 |

* cited by examiner

Primary Examiner—Stanley S. Silverman
Assistant Examiner—Timothy C Vanoy

(57) ABSTRACT

The present invention relates to a composition based on cerium oxide or on cerium and zirconium oxides, in the extruded form, to a process for the preparation thereof and to the use thereof as catalyst. The process for the preparation of the composition of the invention is characterized in that a cerium hydroxide or oxyhydroxide or cerium and zirconium hydroxides or oxyhydroxides are extruded. The composition of the invention can be used as catalyst or catalyst support, in particular in the treatment of exhaust gases from internal combustion engines, in the process for the dehydrogenation of ethylbenzene to styrene, in the catalysis of methanation or in the treatment of a solution or suspension of organic compounds by oxidation via a wet route.

12 Claims, No Drawings

COMPOSITION BASED ON CERIUM OXIDE OR ON CERIUM AND ZIRCONIUM OXIDES, IN THE EXTRUDED FORM, PROCESS FOR THE PREPARATION THEREOF AND USE THEREOF AS CATALYST

This application is a continuation application of application Ser. No. 09/319,371, filed on Nov. 26, 1999, now abandoned, which is a 371 of PCT/FR97/02190, filed Dec. 3, 1997.

The present invention relates to a composition based on cerium oxide or on cerium and zirconium oxides, in the extruded form, to a process for the preparation thereof and to the use thereof as catalyst.

Compositions based on cerium oxide or on mixtures of cerium oxide and of zirconium oxide are well known. They are used in particular as catalyst or catalyst support, in particular for the catalysis of automobile afterburning. These compositions are generally employed in a coating technique, that is to say by mixing them with a binding oxide, such as alumina or silica, and by depositing the mixture obtained, in the form of a layer, on a support. However, the binding oxide can result either in a rapid deactivation of the compositions or in a loss in their selectivity.

On account of this disadvantage, it would be advantageous to be able to obtain these compositions directly in the extruded form. To the knowledge of the Applicant Company, these compositions have never been able to be obtained until now in this form.

The object of the invention is thus to provide these compositions in the form of extrudates.

The Applicant Company has discovered that the use of a specific starting material made it possible to solve this problem.

The invention thus relates to a process for the preparation of a composition based on cerium oxide or on cerium and zirconium oxides which is characterized in that a product is extruded which is based on a cerium hydroxide or oxyhydroxide or on cerium and zirconium hydroxides or oxyhydroxides.

The invention also covers a composition based on cerium oxide or on cerium and zirconium oxides, characterized in that it is provided in the extruded form.

Finally, the invention relates to the use of a composition of the above type as catalyst or catalyst support, in particular in the treatment of exhaust gases from internal combustion engines, in the process for the dehydrogenation of ethylbenzene to styrene and in the catalysis of methanation.

Other characteristics, details and advantages of the invention will become even more fully apparent on reading the following description and various concrete but nonlimiting examples intended to illustrate it.

The product of the invention will first of all be described.

The essential characteristic of the compositions of the invention is their shape.

This is because they are provided in the form of extrudates. Extrudate is understood to mean any object obtained by ejection, under pressure, of a paste through nozzles or dies of chosen shapes. The objects thus obtained can exhibit varied shapes. They can, for example, exhibit cylindrical or semi-cylindrical, square or polygonal cross-sections or alternatively cross-sections in the form of lobes, such as trilobes. The objects can be solid or hollow. They can have the form of a monolith, honeycomb or cylinder, for example.

The compositions of the invention are based on cerium oxide or on cerium and zirconium oxides. This is understood to mean that the cerium oxide or the cerium oxide in combination with the zirconium oxide represent at least 50% by weight of the entire composition. They can be composed essentially or solely of cerium and zirconium oxides with, in addition, if appropriate, one or more additives of the type which will be described hereinbelow.

In the case of compositions based on cerium and zirconium oxides, the respective proportions of cerium and of zirconium can vary within wide limits. More particularly, this proportion, expressed by the Zr/Ce atomic ratio, can vary between 1/20 and 20/1, more particularly between 1/9 and 9/1.

The compositions of the invention can comprise, in addition to cerium and zirconium, additives. These additives will be chosen from those known for improving the catalytic properties of cerium or of zirconium. Use may thus be made of additives for stabilizing the specific surface of these compositions or those known for increasing their oxygen storage capacity.

Mention may be made, as additives, of those belonging to the group consisting of aluminium, silicon, thorium, titanium, niobium, tantalum and rare-earth metals.

Rare-earth metal is understood to mean the elements of the group consisting of yttrium and elements of the Periodic Classification with an atomic number of between 57 and 71 inclusive. Mention may more particularly be made, among rare-earth metals, of yttrium, lanthanum, neodymium and praseodymium.

Mention may also be made, by way of additives, of those belonging to the group consisting of magnesium, scandium, hafnium, gallium and boron.

Finally, mention may be made of additives belonging to the group consisting of iron, bismuth, nickel, manganese, tin and chromium.

It is obvious that all the additives cited here can be present in the compositions of the invention alone or in combination, whatever the group to which they belong. In addition, these additives are generally present in the compositions in the form of oxides.

The amounts of additives can vary within wide proportions. The maximum amount is at most 50%, expressed as weight of oxide of additive with respect to the weight of the entire composition. The minimum amount is that necessary in order to obtain the desired effect. Generally, this amount is at least 0.1%. More particularly, the amount of additive can be between 1 and 20% and more particularly still between 1 and 10%.

The compositions of the invention can exhibit high specific surfaces, even after calcination at high temperature. This surface depends on the nature of the constituents of the composition. The highest surfaces will be obtained for the compositions in which zirconium predominates.

More specifically, the compositions of the invention in which cerium is present with zirconium and where cerium predominates, that is to say that the Ce/Zr atomic ratio is greater than 1, can exhibit specific surfaces of at least 20 $m^2/g$, more particularly of at least 30 $m^2/g$, after calcination at 900° C. for 6 hours. With one or more additives, especially such as scandium and rare-earth metals and in particular lanthanum, praseodymium or neodymium, these surfaces can be at least 35 $m^2/g$ or alternatively at least 40 $m^2/g$ and more particularly still at least 45 $m^2/g$ after calcination under the same conditions. These compositions with additives can also exhibit a surface of at least 20 $m^2/g$ and more particularly still of at least 30 $m^2/g$ after calcination at 1000° C. for 6 hours.

Moreover, the compositions of the invention in which cerium is present with zirconium but where zirconium predominates, that is to say that the Ce/Zr atomic ratio is less than 1, can exhibit specific surfaces of at least 30 m$^2$/g, more particularly of at least 40 m$^2$/g, after calcination at 900° C. for 6 hours. With one or more additives, especially rare-earth metals and in particular lanthanum, praseodymium or neodymium, these surfaces can be at least 50 m$^2$/g or alternatively at least 55 m$^2$/g and more particularly still at least 60 m$^2$/g after calcination under the same conditions. These compositions with additives can also exhibit a surface of at least 30 m$^2$/g and more particularly still of at least 40 m$^2$/g after calcination at 1000° C. for 6 hours.

Specific surface is understood to mean the B.E.T. specific surface determined by nitrogen adsorption in accordance with ASTM Standard D 3663-78 based on the Brunauer-Emmett-Teller method described in the periodical "The Journal of the American Chemical Society, 60, 309 (1938)".

The process for the preparation of the extruded compositions of the invention will now be described.

The main characteristic of the process of the invention is to start from a specific product. This product can be defined in two ways.

The product which is subjected to extrusion may first of all be defined as being a product based on a cerium hydroxide or oxyhydroxide or on cerium and zirconium hydroxides or oxyhydroxides. Such a hydroxide can generally be represented by the formula (1) $M(OH)_x(X)_y \cdot nH_2O$, in which M represents cerium or zirconium and X an anion, x+y being at most equal to 4 and x being other than 0, it being possible for y and n to be zero. The anion X is the anion of the cerium or zirconium compound, in particular a salt, which is generally used in the preparation of the hydroxide, as will be described hereinbelow. It is also possible to start from a product based on an oxyhydroxide of formula (2) $MO_z(OH)_x(X)_y \cdot nH_2O$, in which M and X have the same meaning as above and where x+y+z is at most equal to 4, x and z being other than 0 and it being possible for y and n to be zero. Such an oxyhydroxide can be obtained by drying a hydroxide of formula (1).

It should be noted that, in the formulae (1) and (2), the respective values of x, y, z and n can vary according in particular to the preparation processes used to obtain the hydroxides or oxyhydroxides. Thus, by way of example, n can vary between approximately 0 and 20 and y can be at most 0.5, X being in particular a nitrate anion. It is emphasized here that these values are not limiting, the essential characteristic of the invention being the use in the extrusion operation of a product containing the hydroxide anion.

The product which is subjected to extrusion may also be defined by its preparation processes.

For the preparation of such a product, reference may be made in particular to Patent Application EP-A-300,852 on behalf of the Applicant Company, the teaching of which is incorporated here, which describes the preparation of a ceric hydroxide by reacting a cerium salt solution and a base, optionally in the presence of an oxidizing agent, the proportion of base being such that the pH of the reaction mixture is greater than 7. The cerium hydroxide thus obtained can subsequently be subjected to a hot solvent treatment, in which it is resuspended in water or in a decomposable base and is heated in a closed chamber to a temperature and a pressure which are respectively lower than the critical temperature and the critical pressure of the reaction mixture. Cerium(IV) hydroxides can be obtained by hydrolysis of an aqueous cerium(IV) solution in acidic medium (Patent Application FR-A-2,596,380 on behalf of the Applicant Company).

As regards the preparation of cerium and zirconium hydroxides or oxyhydroxides or of products based on cerium and zirconium which are suitable for extrusion in the context of the present invention, reference may be made to Patent Applications FR-A-2,699,524 and FR-A-2,714,370 on behalf of the Applicant Company, the teaching of which is incorporated here, which describe in particular processes which make it possible to obtain, on conclusion of some of their stages, products of this type.

Thus, a first process of this type which can be described contains the following stages. A liquid mixture is formed comprising cerium and zirconium compounds and, if appropriate, at least one compound of an additive; the mixture obtained is heated; the precipitate formed is recovered; and the said precipitate is optionally dried. The product thus obtained on conclusion of these stages is suitable for extrusion in the present invention.

The first stage of this process thus consists in preparing a liquid mixture, generally an aqueous mixture, containing cerium and zirconium compounds and, if appropriate, at least one compound of an additive. These compounds are generally salts of the abovementioned elements and preferably soluble salts. The liquid mixture can be obtained without discrimination either from compounds initially in the solid state, which will subsequently be introduced into a vessel water heel for example, or alternatively directly from solutions of these compounds and then mixing, in any order, the said solutions.

Mention may in particular be made, as cerium compounds, of cerium salts such as cerium(IV) salts, such as nitrates or ceric ammonium nitrates, for example, which are particularly well suited in this instance. Ceric nitrate is preferably used. The solution of cerium(IV) salts can contain cerium in the cerous state but it is preferable for it to contain at least 85% of cerium(IV). An aqueous ceric nitrate solution can, for example, be obtained by reaction of nitric acid with a ceric oxide hydrate prepared conventionally by reaction of a solution of a cerous salt, for example cerous nitrate, and of an aqueous ammonia solution in the presence of aqueous hydrogen peroxide solution. Use may also be made of a ceric nitrate solution obtained according to the process for electrolytic oxidation of a cerous nitrate solution, as described in the document FR-A-2,570,087, which can constitute an advantageous starting material.

The zirconium compounds can be chosen from zirconium sulphate, zirconyl nitrate or zirconyl chloride. Zirconyl nitrate is particularly well suited. Mention may more particularly be made of the use of a zirconyl nitrate originating from the attack of nitric acid on zirconium carbonate. The zirconium compound can also be a salt of an organic acid, such as acetic acid or citric acid.

It should be noted here that the aqueous solutions of cerium(IV) salts and of zirconyl salts can exhibit a degree of initial free acidity. According to the present invention, it is just as possible to use an initial solution of cerium(IV) and zirconium salts effectively exhibiting a degree of free acidity as mentioned above as solutions which would have been neutralized beforehand more or less exhaustively. This neutralization can be carried out by addition of a basic compound to the abovementioned mixture, so as to limit this acidity. This basic compound can be, for example, an aqueous ammonia solution or alternatively a solution of alkali metal (sodium, potassium and the like) hydroxides but preferably an aqueous ammonia solution. It is then possible to define in practice a degree of neutralization (r) of the initial cerium and zirconium solution by the following equation:

$$r = \frac{n3 - n2}{n1}$$

in which n1 represents the total number of moles of Ce(IV) and of zirconium present in the solution after neutralization; n2 represents the number of moles of OH⁻ ions effectively necessary to neutralize the initial free acidity introduced by the aqueous cerium(IV) and zirconium salt solutions; and n3 represents the total number of moles of OH⁻ ions introduced by the addition of the base. When the "neutralization" alternative form is implemented, use is made in all cases of an amount of base which absolutely must be less than the amount of base which would be necessary to obtain complete precipitation of the cerium zirconium hydroxide species, this amount depending on the composition synthesized. In practice, the limit is therefore set at degrees of neutralization which do not exceed 2.

According to a specific embodiment, use is made, as zirconium compound, of a zirconium solution which exhibits the following characteristic. The amount of base necessary to reach the equivalent point during acid/base quantitative determination of this solution must meet the condition OH⁻/Zr molar ratio ≦1.65. More particularly, this ratio can be at most 1.5 and more particularly still at most 1.3.

Acid/base quantitative determination is carried out in a known way. To carry it out under optimum conditions, a solution which has been brought to a concentration of approximately $3 \times 10^{-2}$ mol per liter, expressed as elemental zirconium, can be quantitatively determined. A 1N sodium hydroxide solution is added thereto with stirring. Under these conditions, the equivalent point (change in the pH of the solution) is determined sharply. This equivalent point is expressed by the OH⁻/Zr molar ratio.

Mention may be made, as compounds of the additives which can be used in the process of the invention, of, for example, salts of inorganic or organic acids, for example of the sulphate, nitrate, chloride or acetate type. It should be noted that the nitrate is particularly well suited. These compounds can also be introduced in the form of sols. These sols can be obtained, for example, by neutralization by a base of a salt of these compounds.

The amounts of cerium, of zirconium and optionally of additives present in the mixture must correspond to the stoichiometric proportions required in order to obtain the desired final composition.

The initial liquid mixture being thus obtained, it is subsequently heated in accordance with the second stage of the process.

The temperature at which this heat treatment, also known as thermal hydrolysis, is carried out can be between 80° C. and the critical temperature of the reaction mixture, in particular between 80 and 350° C., preferably between 90 and 200° C.

This treatment can be carried out, according to the temperature conditions employed, either at normal atmospheric pressure or under pressure, such as, for example, the saturated vapour pressure corresponding to the temperature of the heat treatment. When the treatment temperature is chosen greater than the reflux temperature of the reaction mixture (that is to say, generally greater than 100° C.), for example chosen between 150 and 350° C., the operation is then carried out by introducing the aqueous mixture containing the abovementioned species into a closed chamber (closed reactor, more commonly known as an autoclave), the necessary pressure then resulting only from the heating alone of the reaction mixture (autogenous pressure). Under the temperature conditions given above, and in aqueous media, it is thus possible to specify, by way of illustration, that the pressure in the closed reactor varies between a value greater than 1 bar ($10^5$ Pa) and 165 bar ($165 \times 10^5$ Pa), preferably between 5 bar ($5 \times 10^5$ Pa) and 165 bar ($165 \times 10^5$ Pa). It is, of course, also possible to exert an external pressure which is then added to that resulting from the heating.

The heating can be carried out either under an air atmosphere or under an inert gas atmosphere, preferably nitrogen.

The duration of the treatment is not critical and can thus vary within wide limits, for example between 1 and 48 hours, preferably between 2 and 24 hours.

On conclusion of the heating stage, a solid precipitate is recovered which can be separated from its mixture by any conventional solid/liquid separation technique, such as, for example, filtration, settling, draining or centrifuging.

It may be advantageous, on conclusion of this second stage, to bring the reaction mixture thus obtained to a basic pH. This operation is carried out by adding a base, such as, for example, an aqueous ammonia solution, to the mixture.

Basic pH is understood to mean a pH value greater than 7 and preferably greater than 8.

It is also possible to add, in the same way, after the heating stage, aqueous hydrogen peroxide solution.

It should be noted that it is, of course, possible to repeat, one or a number of times, in an identical or nonidentical way, after recovery of the product and possible addition of the base or of the aqueous hydrogen peroxide solution, a heating stage as described above, the product then again being placed in liquid medium, in particular in water, and heat treatment cycles, for example, being carried out.

The product as recovered can subsequently be subjected to washing operations with water and/or with aqueous ammonia, at a temperature of between room temperature and the boiling temperature. In order to remove the residual water, the washed product can finally, optionally, be dried, for example with air, at a temperature which can vary between 80 and 300° C., preferably between 100 and 150° C., drying being continued until a constant weight is obtained.

It is also possible to carry out drying by atomization of the precipitate obtained. In this case, it is then unnecessary to separate the precipitate from the reaction mixture in which it has been obtained. The reaction mixture can be left to separate by settling, the supernatant can then be drawn off and, finally, drying can be carried out by atomization.

A second process for the preparation of the cerium and zirconium hydroxides or oxyhydroxides can also be employed in which a precipitation is carried out. According to this second process, a liquid mixture is formed comprising a cerium compound or cerium and zirconium compounds and, if appropriate, at least one compound of an additive; a base is added to the mixture obtained; the precipitate formed is recovered; and the said precipitate is optionally dried. The product thus obtained on conclusion of these stages is suitable for extrusion in the present invention.

That which has been described above with respect to the compounds of cerium, of zirconium and of the additives also applies here.

In the second stage of this second process, a base is added to the liquid mixture formed previously. Products of the hydroxide type can be used as base. Alkali metal or alkaline-earth metal hydroxides may be mentioned. Secondary, tertiary or quaternary amines can also be used. However, amines and ammonia may be preferred insofar as they decrease the risks of pollution by alkali metal or alkaline-earth metal cations. Mention may also be made of urea. The reactants can be introduced in any order, it being possible for the base to be introduced into the mixture or vice versa or it alternatively being possible for the reactants to be introduced simultaneously into the reactor.

Addition can be carried out on a single occasion, gradually or continuously, and it is preferably carried out with stirring. This operation can be carried out at a temperature of between room temperature (18–25° C.) and the reflux temperature of the reaction mixture, it being possible for the latter to reach 120° C., for example. It is preferably carried out at room temperature.

At the end of the addition of the base, the reaction mixture can optionally still be kept stirring for some time, in order to bring the precipitation to completion.

When the base is added continuously, the pH of the reaction mixture is preferably maintained between approximately 7 and approximately 11, more particularly between 7.5 and 9.5.

An alternative form of this second process can be stated here, this alternative form corresponding to the teaching of FR-A-2,714,370, which has been mentioned above. In this alternative form, the reaction with the base takes place in the presence of a carbonate or bicarbonate. The term carbonate must be understood as also being able to comprise a hydroxycarbonate. Mention will be made, by way of example, of ammonium carbonate or bicarbonate. Moreover, the reaction takes place under conditions such that the pH of the reaction mixture remains neutral or basic. The pH value of the reaction mixture is generally at least 7 and is between 7 and 7.5 in the case of a neutral mixture and more particularly at least 8 in the case of a basic mixture. More specifically, this value can be between 7.5 and 14, in particular between 8 and 11 and more particularly between 8 and 9.

According to a specific embodiment of this alternative form, the liquid mixture comprising the cerium and zirconium compounds and optionally the compound of the additive is introduced, with the carbonate or the bicarbonate, into a basic solution. It is thus possible, for example, to form a vessel heel with the basic solution, into which the liquid mixture is introduced.

It is also possible, in this alternative form, to carry out the operation continuously. In this case, the liquid mixture comprising the cerium and zirconium compounds and optionally the compound of the additive, the base and the carbonate or the bicarbonate are introduced simultaneously into a reactor, an excess of base being provided in order to fulfil the pH condition.

On conclusion of the precipitation stage of the second process, a mass of a solid precipitate is recovered which can be separated from its mixture and optionally dried as described above for the first process.

The cerium and zirconium hydroxide(s) or oxyhydroxide(s) and the product(s) which have been obtained by the processes described above will subsequently be shaped by extrusion.

They can be extruded directly or else in the form of a mixture with an acidic solution. The presence of an acidic solution facilitates the shaping. Use may be made, as acid, of, for example, nitric acid, stearic acid, oxalic acid or acetic acid. The amount of acid used is generally between approximately 0.1 and 5%, expressed as moles of acid with respect to the sum of the moles of cerium and of zirconium.

The cerium and zirconium hydroxide(s) or oxyhydroxide(s) and the product(s) which have been obtained by the processes described above can also be extruded as a mixture with known shaping additives, such as cellulose, carboxymethylcellulose, carboxyethylcellulose, xanthan and succinoglycan gums, surface-active agents, flocculating agents, such as polyacrylamides, carbon black, starches, poly(acrylic alcohol), poly(vinyl alcohol), glucose or polyethylene glycols.

An important advantage of the invention is that the product to be extruded can be extruded in the absence of the binders which are normally used in this type of technique. Of course, it would not be departing from the scope of the present invention to use a binder which can be chosen from silica, alumina, clays, silicates, titanium sulphate or ceramic fibres, in particular in proportions normally used, that is to say up to approximately 30% by weight.

The cerium and zirconium hydroxide(s) or oxyhydroxide(s) and the product(s) which have been obtained by the processes described above, either alone or as a mixture with the abovementioned acidic solution or shaping additives or alternatively the abovementioned binders, preferably exhibit, before extrusion, a loss on ignition of between 25 and 75%, more particularly between 40 and 65%. The loss on ignition (LOI) is measured as the loss in weight corresponding to the ratio:

$$\text{LOI in \%} = (W_0 - W_1)/W_0, \text{ in which:}$$

$W_0$ is the initial weight of the starting material $W_1$ is the weight of this starting material after calcination for 2 hours at 1000° C. and cooling to room temperature in an anhydrous chamber.

Prior to the extrusion, the cerium and zirconium hydroxide(s) or oxyhydroxide(s) and the product(s) which have been obtained by the processes described above are kneaded. The duration of the kneading can vary within wide limits, for example between 1 minute and three hours.

Extrusion takes place in any appropriate device.

The extruded product is optionally dried and subsequently calcined.

Calcination is carried out at a temperature generally of between 200 and 1200° C., preferably between 300 and 900° C. and more particularly still between 500° C. and 900° C. This calcination temperature must be sufficient to convert the precursors to oxides and it is also chosen as a function of the temperature of subsequent use of the catalytic composition and by taking into account the fact that the specific surface of the product decreases as the calcination temperature employed increases. The duration of the calcination can, for its part, vary within wide limits, for example between 1 and 24 hours, preferably between 4 and 10 hours. The calcination is generally carried out under air but a calcination carried out, for example, under inert gas is very clearly not excluded.

The extrudates thus obtained can be employed in combination with catalytically active metals of the precious metal type. The nature of these metals and the techniques for the incorporation of the latter in these compositions are well known to a person skilled in the art. For example, the metals can be platinum, rhodium, palladium, ruthenium or iridium; they can in particular be incorporated in the compositions by impregnation.

The extrudates of the invention can be used very particularly in the treatment of exhaust gases from internal combustion engines, in the process for the dehydrogenation of ethylbenzene to styrene or in the catalysis of methanation.

More generally, they can be used in the catalysis of various reactions, such as, for example, dehydration, hydrosulphurization, hydrodenitrification, desulphurization, hydrodesulphurization, dehydrohalogenation, reforming, steam reforming, cracking, hydrocracking, hydrogenation, dehydrogenation, isomerization, dismutation, oxychlorination, dehydrocyclization of hydrocarbons or of other organic compounds, oxidation and/or reduction reactions, the Claus reaction, demetallation, the shift conversion or the treatment of a solution or suspension of organic compounds by oxidation via a wet route.

The latter treatment of an aqueous solution or suspension of organic compounds takes place at a high temperature and a high pressure by oxidation of the organic compounds by gas containing oxygen in the presence of an oxidation catalyst in order to reduce the chemical oxygen demand of the said solution or suspension to a predetermined level. It is characterized in that the catalyst comprises a catalytically active phase present on a support composed of a composition based on a cerium oxide and on a zirconium oxide in a cerium/zirconium atomic proportion of at least 1, exhibiting a specific surface, after calcination for 6 hours at 900° C., of at least 35 $m^2/g$ and an oxygen storage capacity at 400° C. of at least 1.5 ml of $O_2/g$. This support can be provided in the form of an extrudate. The catalytically active phase is composed of ruthenium or of iridium in the metal form or in the oxide form.

The oxidation reaction is carried out by employing, as oxidizing gas, a gas containing oxygen, such as, for example, pure oxygen, air, air enriched with oxygen or residue gases containing oxygen.

The amount of gas supplied is determined from the chemical oxygen demand (COD) of the solution to be treated. Generally, the gas containing oxygen is used in an amount equal to 1 to 1.5 times the theoretical amount of oxygen.

The oxygen pressure is advantageously between 1 and 50 bar, the total pressure of the gases being sufficiently high to keep the solution or suspension in the liquid state at the temperature of the reaction.

This reaction temperature is advantageously between 100° C. and 400° C., preferably between 120° C. and 200° C. This temperature depends in particular on the nature of the organic compounds present in the effluents to be treated.

The aqueous solutions or suspensions which can be treated by this process are aqueous liquors which preferably contain oxidizable organic substances, such as aqueous effluents exhibiting a moderately concentrated chemical oxygen demand, advantageously of less than 200 g/l.

Examples of waste water are, for example, waste water originating from industrial plants, such as the chemical or oil industries, municipal effluents, waste water containing oils or waste water originating from a gas purification process or an activated sludge process. Advantageously, to avoid fouling the plants and the catalyst, these aqueous liquors can be filtered before being treated.

Examples will now be given.

EXAMPLE 1

This example illustrates the preparation of an oxide support in the extruded form of formula $Ce_{0.62}Zr_{0.38}O_2$.

A ceric nitrate solution and a zirconyl nitrate solution are mixed in the stoichiometric proportions required in order to obtain the above mixed oxide. The zirconyl nitrate solution was obtained by attack on a carbonate using concentrated nitric acid. The solution meets, within the meaning defined above, the condition $OH^-/Zr$ molar ratio=0.94.

The concentration of this mixture (expressed as oxides of the various elements) is adjusted to 80 g/l. This mixture is subsequently brought to 150° C. for 4 hours.

An aqueous ammonia solution is subsequently added to the reaction mixture, so that the pH is greater than 8.5. The reaction mixture thus obtained is brought to boiling point for 2 hours. After separation by settling and then drawing off, the solid product is resuspended and the mixture thus obtained is treated for 1 hour at 100° C. The product is subsequently filtered off. The filtration cake thus obtained exhibits a loss on ignition at 1000° C. of 60.6%. The cerium/zirconium hydroxide or oxyhydroxide is kneaded for 15 minutes before being shaped by extrusion through a 3.2 mm die. The equipment used is a single-screw extruder sold by the company Lhomargie. The extrudates obtained have the form of a cylinder with a diameter of 1.2 mm. They are subsequently dried at 100° C. for 1 hour before being calcined at 600° C. under air.

The shaped oxide exhibits a specific surface, after treatment at 900° C. under air for 6 hours, of 39 $m^2/g$ and, at 1000° C. for 6 hours, of 17 $m^2/g$.

EXAMPLE 2

This example illustrates the preparation of an oxide support in the extruded form of formula $Ce_{0.17}Zr_{0.83}O_2$.

A zirconyl nitrate solution (obtained by attack of nitric acid on a Zr carbonate) is added to a cerium(IV) nitrate solution in the respective proportions, by weight of oxide, of 80/20 and such that the ratio r as defined above is 0.5. The concentration is adjusted to 80 g/l and the solution is then brought to 150° C. for 6 hours. After cooling, the pH of the reaction mixture is brought to a value of 8.5 using an ammonia solution. The temperature is subsequently brought to 100° C. After cooling, the mother liquors are removed by settling and an equivalent amount of water is added. The reaction mixture is again brought to 100° C. After separation by settling, the supernatant is removed and the product is dried by atomization. The powder obtained is kneaded with an aqueous nitric acid solution with a concentration such that the $HNO_3/Zr+Ce$ ratio is equal to 0.025 and the loss on ignition of the paste at 1000° C. is 45%. The cerium/zirconium hydroxide obtained is subsequently shaped as in Example 1 and then dried at 100° C. for 1 hour before being calcined at 500° C. under air.

The specific surface of the oxide thus obtained is 45 $m^2/g$ after calcination for 6 hours at 900° C.

X-ray diffraction analysis shows that the oxide obtained is in the form of a solid solution pure phase.

EXAMPLE 3

This example illustrates the preparation of an oxide support in the extruded form of formula $Ce_{0.75}Zr_{0.25}O_2$.

The two following solutions constitute the starting materials.

Solution 1:

116.7 g of Ce(III) nitrate
(29.5% $CeO_2$)
24.7 g of zirconyl nitrate
(19.9% ZrO)
124 g of $H_2O$ Solution 2:

47.4 g of ammonium bicarbonate
35.2 g of $NH_4OH$ (29% as $NH_3$)
240.4 g of $H_2O$ Solution 1 is preheated to 80° C. It is added over 5 minutes to Solution 2, originally maintained at a temperature of 25° C. The mixture is filtered through a Büchner funnel with a diameter of 15 cm and the residue is washed with 500 ml of water. The product is subsequently dried at 125° C. in a ventilated oven.

The powder obtained is shaped as in Example 1 with an addition of an aqueous acetic acid solution with a concentration such that the $CH_3CO_2H/Zr+Ce$ ratio is equal to 0.030 and the loss on ignition of the paste at 1000° C. is 51%.

The cerium/zirconium hydroxide obtained is dried at 100° C. for 1 hour before being calcined at 700° C. under air.

The shaped oxide exhibits a specific surface, after treatment at 900° C. under air for 6 hours, of 30 m²/g.

What is claimed is:

1. A process for the preparation of a composition comprising cerium oxide or cerium oxide and zirconium oxide, in an extruded form, the cerium oxide and the zirconium oxide representing at least 50% by weight of the entire composition, the composition in the extruded form having a specific surface of at least 30 m²/g, after a calcination at 900° C. for 6 hours, comprising the steps of:

a) extruding a product comprising a cerium hydroxide or a cerium oxyhydroxide or a product comprising hydroxides of cerium and of zirconium or oxyhydroxides of cerium and of zirconium, presenting a loss on ignition of between 25 and 75%, to obtain an extruded composition, and b) recovering the extruded composition.

2. A process according to claim 1, wherein step a) comprises the following steps:

aa) mixing in a liquid mixture a cerium compound or cerium and zirconium compounds, bb) heating the mixture to obtain a precipitate comprising a cerium hydroxide or a cerium oxyhydroxide or a product comprising hydroxides of cerium and of zirconium or oxyhydroxides of cerium and of zirconium, cc) recovering the precipitate, dd) optionally, drying said precipitate, and ee) extruding said precipitate.

3. A process according to claim 1, wherein step a) comprises the following steps:

aa) mixing in a liquid mixture a cerium compound or cerium and zirconium compounds, bb) adding a base to the mixture to obtain a precipitate comprising a cerium hydroxide or a cerium oxyhydroxide or a product comprising hydroxides of cerium and of zirconium or oxyhydroxides of cerium and of zirconium, cc) recovering the precipitate, dd) optionally, drying said precipitate, and ee) extruding said precipitate.

4. A process according to claim 1, wherein step a) comprises the following steps:

aa) hydrolysing an aqueous cerium (IV) solution in acidic medium to obtain a precipitate comprising a cerium hydroxide or a cerium oxyhydroxide or a product comprising hydroxides of cerium and of zirconium or oxyhydroxides of cerium and of zirconium, bb) recovering the precipitate, cc) optionally, drying said precipitate, and ee) extruding said precipitate.

5. A process according to claim 1, wherein step a) comprises the step of reacting a reaction mixture comprising a cerium salt solution, a base, and optionally an oxidizing agent, the proportion of base being such that the pH of the reaction mixture is greater than 7.

6. A process according to claim 1, wherein the product comprising a cerium hydroxide, cerium oxyhydroxide, hydroxides of cerium and of zirconium or oxyhydroxides of cerium and of zirconium, is mixed with an acidic solution.

7. A process according to claim 1, wherein the composition comprises cerium oxide and zirconium oxide, present in a Zr/Ce atomic ratio of between 1/20 and 20/1.

8. A process according to claim 7, wherein the atomic ratio is of between 1/9 and 9/1 .

9. A process according to claim 1, wherein the composition further comprises at least one additive selected from the group consisting of aluminum, silicon, thorium, titanium, niobium, tantalum and rare-earth metals.

10. A process according to claim 1, wherein the composition further comprises at least one additive selected from the group consisting of magnesium, scandium, hafnium, gallium, and boron.

11. A process according to claim 1, wherein the composition further comprises at least one additive selected from the group of iron, bismuth, nickel, manganese, tin and chromium.

12. A process according to claim 1, wherein the loss of ignition is of between 40 and 65%.

* * * * *